United States Patent
Knapp et al.

(10) Patent No.: US 9,002,134 B2
(45) Date of Patent: Apr. 7, 2015

(54) MULTI-SCALE IMAGE NORMALIZATION AND ENHANCEMENT

(75) Inventors: Jason F. Knapp, Miamisburg, OH (US); Steve W. Worrell, Springboro, OH (US)

(73) Assignee: Riverain Medical Group, LLC, Miamisburg, OH (US)

( * ) Notice: Subject to any disclaimer, the term of this patent is extended or adjusted under 35 U.S.C. 154(b) by 1357 days.

(21) Appl. No.: 12/425,917

(22) Filed: Apr. 17, 2009

(65) Prior Publication Data

US 2010/0266189 A1 Oct. 21, 2010

(51) Int. Cl.
*G06K 9/40* (2006.01)
*G06T 5/40* (2006.01)
*G06T 5/00* (2006.01)

(52) U.S. Cl.
CPC . *G06T 5/40* (2013.01); *G06T 5/002* (2013.01); *G06T 5/008* (2013.01); *G06T 2207/10116* (2013.01); *G06T 2207/20008* (2013.01); *G06T 2207/20016* (2013.01); *G06T 2207/20064* (2013.01); *G06T 2207/30061* (2013.01)

(58) Field of Classification Search
USPC ......................................................... 382/294
See application file for complete search history.

(56) References Cited

U.S. PATENT DOCUMENTS

| | | | |
|---|---|---|---|
| 5,915,036 A * | 6/1999 | Grunkin et al. ............... 382/132 |
| 6,078,701 A * | 6/2000 | Hsu et al. ...................... 382/294 |
| 6,091,519 A * | 7/2000 | Ito ................................. 358/521 |
| 6,173,034 B1 | 1/2001 | Chao |
| 6,185,327 B1 * | 2/2001 | Niederbaumer et al. ..... 382/168 |
| 6,594,394 B1 | 7/2003 | Stromberg et al. |
| 6,900,908 B1 | 5/2005 | Brady et al. |
| 7,664,302 B2 | 2/2010 | Snoeren et al. |
| 7,668,358 B2 | 2/2010 | Snoeren et al. |
| 2002/0118887 A1 | 8/2002 | Gindele |
| 2003/0097309 A1 | 5/2003 | Gibler et al. |
| 2003/0215153 A1 | 11/2003 | Gindele et al. |
| 2004/0109610 A1 | 6/2004 | Kodama et al. |
| 2005/0276443 A1 | 12/2005 | Slamani et al. |
| 2006/0227935 A1 | 10/2006 | Ikeda et al. |
| 2007/0191708 A1 | 8/2007 | Gerold et al. |
| 2008/0174606 A1 | 7/2008 | Rengarajan et al. |

FOREIGN PATENT DOCUMENTS

| | | |
|---|---|---|
| CN | 1954339 A | 4/2007 |
| JP | 2001299733 A | 10/2001 |
| JP | 2009054013 A | 3/2009 |
| JP | 2009070407 A | 4/2009 |

OTHER PUBLICATIONS

Adelson et al, Pyramid methods in image processing, RCA Engineer 1984.*
Keren et al, Image Sequence Enhancement Using Sub-pixel Displacements, IEEE 1988.*
(Continued)

*Primary Examiner* — Mark Roz
(74) *Attorney, Agent, or Firm* — Panitch Schwarze Belisario & Nadel LLP

(57) ABSTRACT

An image may be processed to normalize and/or remove noise from the image. The processing of the image may involve decomposition of the image into multiple components and subsequent gray scale registration across multiple scales.

13 Claims, 9 Drawing Sheets

(56) References Cited

OTHER PUBLICATIONS

Philippe Thévenaz, Optimization of Mutual Information for Multiresolution Image Registration, IEEE 2000.*

Dinggang Shen, Image registration by local histogram matching, Pattern Recognition 2007.*

International Search Report and Written Opinion issued in related International Application No. PCT/US2009/043755 on Jul. 14, 2009.

"Gray scale registration of mammograms using a model of image acquisition," Inf. Process. Med. Imaging, 18:401-12, Jul. 2003.

First Office Action issued in Chinese Patent Application No. 200980159353.3 dated Nov. 5, 2012, with English Translation.

Chinese Search Report issued in Chinese Patent Application No. 200980159353.3 dated Oct. 25, 2012, with English Translation.

Second Office Action issued in Chinese Patent Application No. 200980159353.3 dated Apr. 17, 2013.

Chinese Supplementary Search Report issued in Chinese Patent Application No. 200980159353.3 dated Apr. 8, 2013.

First Office Action issued in Japanese Patent Application No. 2012-505871 dated May 7, 2013.

* cited by examiner

MULTI-SCALE IMAGE NORMALIZATION AND ENHANCEMENT

BACKGROUND

Radiographic imaging for medical purposes is well known in the art. Radiographic images of the chest, for example, provide important diagnostic information for detecting and treating a large number of medical conditions involving the lungs, bony structures in the chest, the upper abdominal organs, the vascular structures of the lungs, and the disc spaces of the mid-thoracic spine.

Because of the great advantages provided by digital images, radiographs are increasingly stored and manipulated in digital form. Digital radiographs may be created either by direct capture of the original image in digital form, or by conversion of an image acquired by an "analog" system to digital form. Digital images simplify record keeping, such as in matching radiographs to the correct patient, and allow for more efficient storage and distribution. Digital images also allow for digital correction and enhancement of radiographs, and for application of computer-aided diagnostics and treatment.

Radiologists are highly skilled in interpreting radiographic images, but limitations of radiographic systems, and variability between systems, can hamper proper interpretation. Sources of variability related to the acquisition of radiographic images may include the spatial sampling of the images; the gray scale resolution (or "bit depth"); the Modulation Transfer Function ("MTF") of the system; image contrast; and noise.

The sampling function of an image can generally be expressed as the number of pixels in a unit length. Generally, sampling is performed at or near the Nyquist rate to avoid aliasing. For example, a highly-detailed chest radiogram may have 5,000 pixels per inch, for a minimum discernable feature size of 200 microns. A uniform spatial resolution between images can be important in automated systems, such as when software is used to identify or analyze features having specific spatial characteristics in a radiogram.

Bit depth is the number of data bits used to store the brightness value of each pixel of an image. Different radiographic systems may produce radiograms with different bit depths. For example, bit depths commonly range from 10 to 12 bits. Bit depth is important not just in respect to the quality of the original image, but becomes a limiting factor when digitally manipulating images, such as when processing the images to accentuate particular features or in computer-aided diagnosis. Insufficient bit depth can result in degraded processed images, imaging artifacts, and unreliable diagnostic results.

Modulation Transfer Function (MTF) is the spatial frequency response of an imaging system, or of an imaging component. High spatial frequencies correspond to fine image detail, while low spatial frequencies correspond to larger structures. The contrast produced on a radiographic image by features of different sizes may differ due to the system MTF. Typically, the contrast of features at a high spatial frequency can be reduced relative to the contrast of features at a low spatial frequency due to the limited resolving power of the imaging instrument. Because of the reduction in amplitude variation of smaller features due to MTF, the visibility of smaller features in a radiograph may be masked by overlying larger structures in the image.

Contrast involves the brightness differences between neighboring pixels in an image. Contrast concerns not just the absolute difference between the brightest and darkest pixels, but also the brightness distribution of the intermediate pixels. For example, the distribution of brightness values may be skewed towards the bright or dark end of the distribution range, making it difficult to discern features having similar brightness. For both the human observer and for automated systems, it is beneficial that different radiographic images have substantially similar contrast to ensure consistent interpretation during reading or processing.

One technique used to correct for differences in gray scale appearance is known as histogram matching. A histogram is essentially a bar graph representation of the distribution of pixel values in an image, in which the heights of the bars are proportional to the number of pixels in the image having that pixel value. As is known in the art, histogram matching is a pixel mapping derived from an input cumulative density function (CDF) and a target CDF. As CDFs are monotonic and lie in the 0-1 range, histogram matching is a simple matter of alignment, or matching, the two CDFs. Histogram matching is generally used in areas where it is of interest to be able to directly compare pixels values of similar scenes; it is a global technique in that it uses pixel values and not spatial information in anyway. It does not, for example, address the problem localized contrast differences in images of the same scene.

Noise is a universal limitation of all measurement systems, including radiographic systems. In radiographic systems, it is generally necessary to limit the cumulative exposure of a subject to x-rays; a tradeoff for short exposure times is an increase in noise on the resulting image. Noise on radiographic images tends to primarily manifest themselves at higher spatial frequencies. At the highest spatial frequencies, noise may predominate, limiting the ability to discern detail in an image.

Both to improve the uniformity of radiographic images for interpretation by radiologists and other professionals, and to provide a good foundation for subsequent digital processing and analysis of the images, a principled system for normalization of images may be desirable. The normalization process may account for differences between images at difference spatial frequencies and may address the problems of contrast and noise.

SUMMARY

Embodiments of the invention may include methods that convert radiographic images, such as chest radiograms, to a uniform size, or pixel spacing, and bit depth; decompose the images into spatial components; separately adjust the grayscale distribution of the spatial components; reduce image noise; and produce a re-combined enhanced output image. The gray-scale distribution of the spatial components may be based on a statistical ensemble, derived from the source of the radiographic images, an analytic model, or derived on a per image basis to maximize or minimize an objective function.

Various embodiments of the invention may be in the forms of methods, apparatus, systems, and/or computer-readable media containing processor-executable instructions to execute methods. It is further noted that it is anticipated that such methods may be performed by an automated processing device, for example, but not limited to, an image processing device, by a general purpose processor or computer, etc.

DESCRIPTION OF EMBODIMENTS OF THE INVENTION

Figure 1:
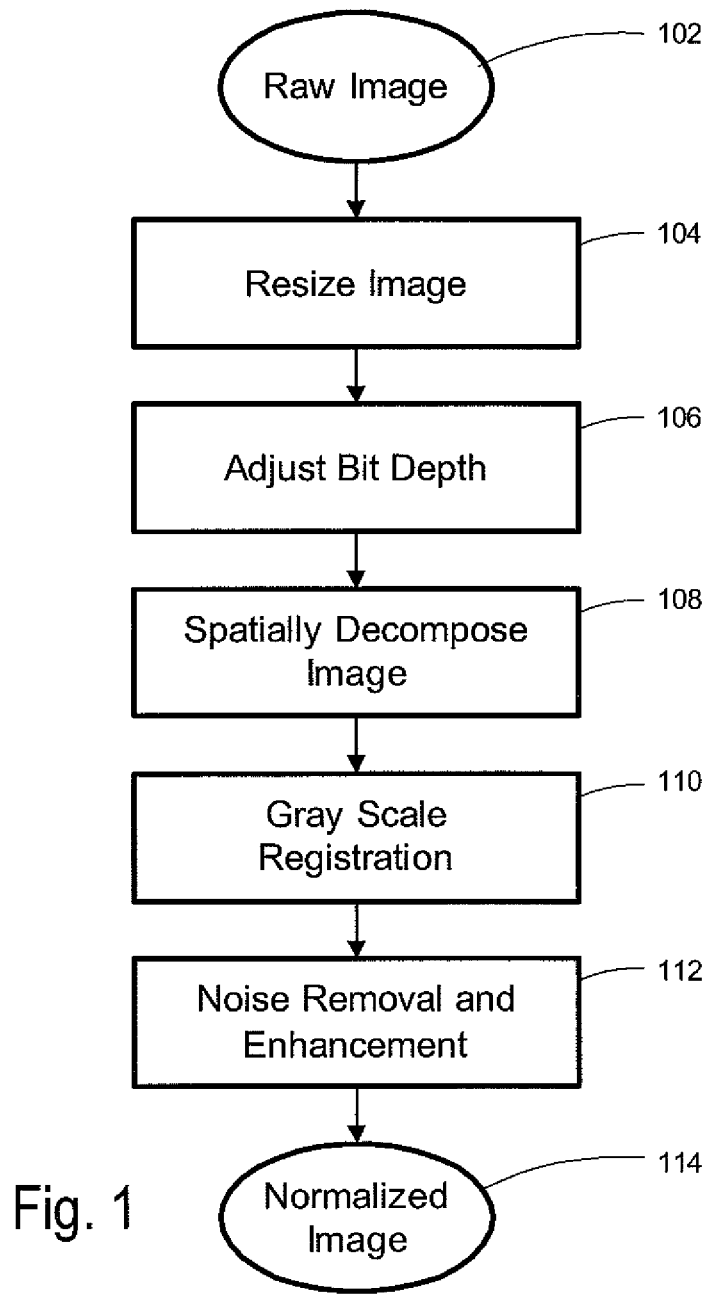
FIG. 1 is a flow diagram providing an overview of embodiments of the invention.

FIG. 1 is a flow diagram providing an overview of embodiments of the invention. Embodiments of the invention may typically begin with an image 102, such as a chest x-ray. The various systems used to "capture" x-rays may produce images having different resolutions (pixels per unit area) and different bit depths (the number of data bits used to store each pixel). The method may thus begin with resizing 104 the raw image, if necessary, to a standard resolution for subsequent processing. An exemplary embodiment of the invention, for example, utilizes an image resolution of 5,000 pixels per linear inch, for a resolution of 200 microns.

To provide a standard bit depth for subsequent processing, the image bit depth may then be adjusted 106. The limited bit depth of some capture systems may not be adequate for the subsequent processing steps in the normalization process, and might result in a poor image quality or processing artifacts. An exemplary embodiment of the invention uses a bit depth of 10 bits per pixel, allowing for 1024 intensity levels, as further explained with respect to FIGS. 3 and 4, below.

Although shown in FIG. 1 as occurring after the resizing of the image, in other embodiments bit depth adjustment may be performed first.

After the image has been modified to a standard resolution and bit depth, a multi-scale (or multi-resolution) decomposition 108 may be performed to separate the image into sub-images, which may contain different frequency components from the original image. There are a variety of methods that may be employed for multi-scale decomposition, including Steerable or Laplacian pyramids, wavelets, curvelets, and so on. An exemplary embodiment of the invention, to which the invention is not limited, utilizes a non-decimated wavelet decomposition with a B3-spline as the scaling function.

Typically, multi-scale decompositions may result in sub-images covering a frequency range of 2:1, with the sub-image including the highest frequency components covering the upper half of the frequencies; and with each subsequent sub-image covering the upper half of the remaining bandwidth. A "residual" image may also be generated, which covers the lower frequencies not otherwise included in the other sub-images.

Multi-scale decompositions may be "decimating", in that each subsequent level of the decomposition may result in an image smaller in size than an image of the previous level (for example, each subsequent level may have half the number of pixels, both horizontally and vertically). Decimation may allow for more efficient algorithms and therefore faster execution. Since it may be useful, however, to have all the sub-images of the same size and resolution in the gray-scale registration step discussed below, exemplary embodiments of the invention may utilize non-decimating decomposition.

In an exemplary embodiment, to which the invention is not limited, the image is decomposed into a multi-scale representation using a redundant (non-decimating) wavelet transform, resulting in 7 levels, with the highest level corresponding to spatial frequencies up to the 200 micron pixel spacing and the lowest level corresponding to approximately 13 cm. The decomposition in this exemplary embodiment may be non-decimating, in order achieve translation invariance and potential artifacts associated with reconstruction. The exemplary embodiment utilizes a B3-spline as the scaling function (smoothing filter), which may have band-pass characteristics similar to that of a Gaussian kernel; the decomposition may, therefore, be similar to a Laplacian pyramid. The decomposition of the image is discussed further with respect to FIGS. 5, 6 and 7, below.

After decomposition, the resultant sub-images may be subjected to gray-scale registration 110 and noise removal and enhancement 112. The sub-images from the decomposition of the image may each capture structure for a particular scale. In order to account for sensor variation associated with MTF and contrast, each sub-image may be mapped to a target distribution using histogram specification, as known in the art. In effect, embodiments of the invention may combine the local nature of the decomposition with the global matching properties of histogram matching.

In an exemplary embodiment, the target distributions may be defined by Cumulative Density Functions (CDFs) that may be formed by averaging multiple images from a set of radiographic images. In an exemplary embodiment, all data may be taken from the lung-field, which may typically include both air-filled and opaque portions. It is envisioned that this averaging process may serve to reduce the patient specificity of images while reinforcing the persistent sensor characteristics, and to thereby minimize irrelevant "noise" associated with a particular acquisition device and/or patient.

Figure 2A:
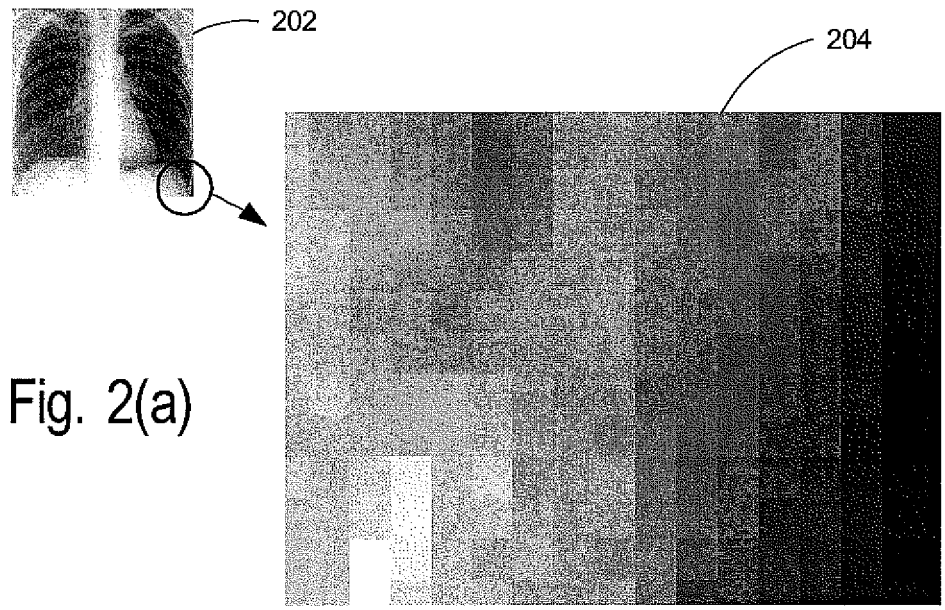
FIG. 2 further illustrates the resizing of an image, with FIG. 2(a) showing a portion of an original image at a first resolution, and FIG. 2(b) showing the a portion of the resized image at a second resolution.
Figure 2B:
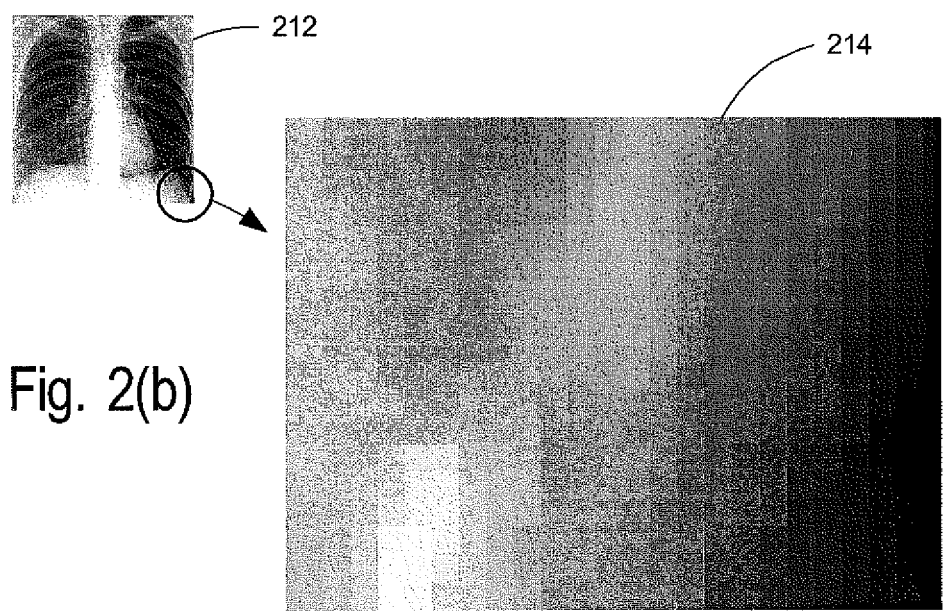

Continuing with the description of embodiments of the invention, FIG. 2 illustrates an example of the resizing of the raw image in additional detail. As seen in FIG. 2(a), a "raw" image 202 may be composed of pixels 204 having a first resolution. To convert the raw image to an output image 212 having pixels 214 of a standardized second resolution, one of many known resizing algorithms may be used, including "nearest neighbor", "bilinear", and "bicubic". An exemplary embodiment of the invention, to which the invention is not limited, uses bilinear interpolation, which may be used to linearly interpolate the value of a pixel from the values of the nearest 4 original pixels.

Figure 3:
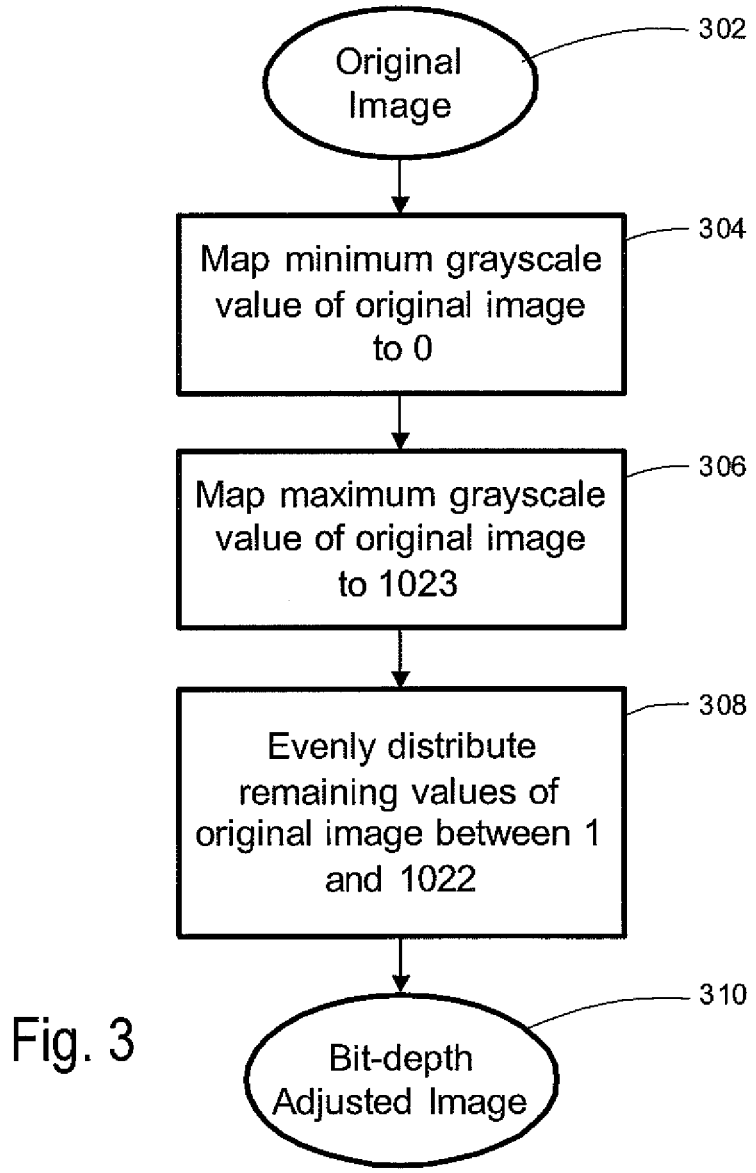
FIG. 3 is a flow diagram further illustrating the bit-depth adjustment of an image according to an embodiment of the invention.
Figure 4A:
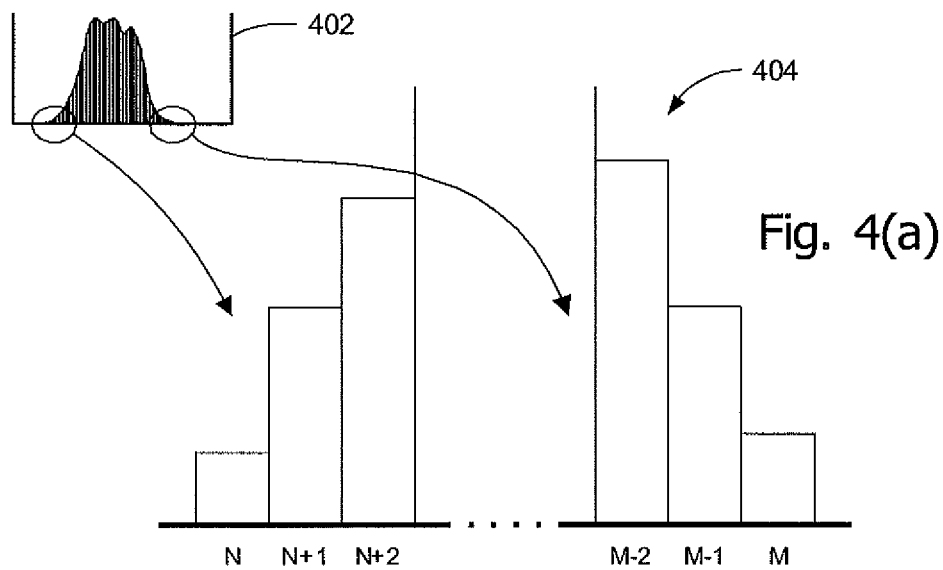
FIG. 4 schematically illustrates bit depth adjustment at a histogram level, with FIG. 4(a) illustrating a histogram of an original image, and FIG. 4(b) illustrating the histogram of the bit-depth adjusted image.
Figure 4B:
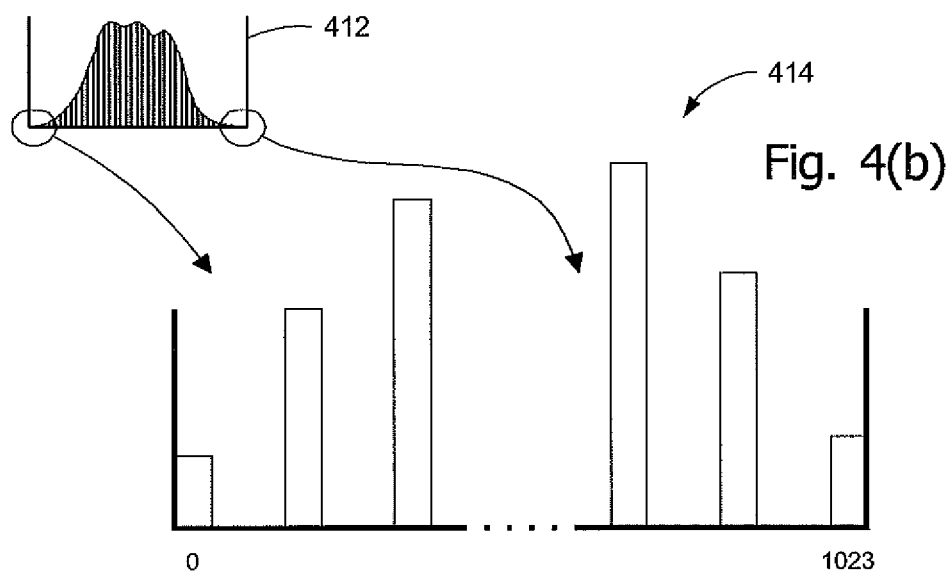

FIG. 3 is a flow diagram further illustrating the bit-depth adjustment of the original raw image 302 according to an embodiment of the invention, and FIG. 4 schematically illustrates at a histogram level how bit depth adjustment may be accomplished. As seen at 402, the raw input image may not fully use the dynamic range available in its native format, in that the ends of the corresponding histogram may not extend fully to end of the "dark" and "light" ranges. As better seen at 404, the pixel grayscale values may range from a first arbitrary value "N" to another arbitrary value "M", rather than from the lowest possible grayscale value (i.e., zero) to the highest possible grayscale value.

In an exemplary embodiment of the invention, bit depth adjustment may first map 304 the minimum grayscale value of the original image (denoted "N" at 404) to, for example, zero in the resized image, and may then map 306 the maximum grayscale value of the original image (denoted "M" at 404) to, for example, 1023, the highest value possible with a bit depth of 10 (an example to which the invention is not limited). The remaining pixel values of the original image, in this example, may then be uniformly distributed 308 between "1" and "1022" in the bit-depth adjusted image 310, which may result in a distribution such as shown at 414 (in increasing the bit depth, it may be noted that not all grayscale values in the adjusted image may be utilized).

The mapping of the minimum grayscale value in the original image to "0" and the maximum grayscale value to "1023", while limiting the remaining grayscale values to the range of 1 to 1022, may serve to preserve the minimum and maximum, which can later help with artifact detection. Again, it is noted that the mapping from 0 to 1023 is an example to which the invention is not limited.

Figure 5:
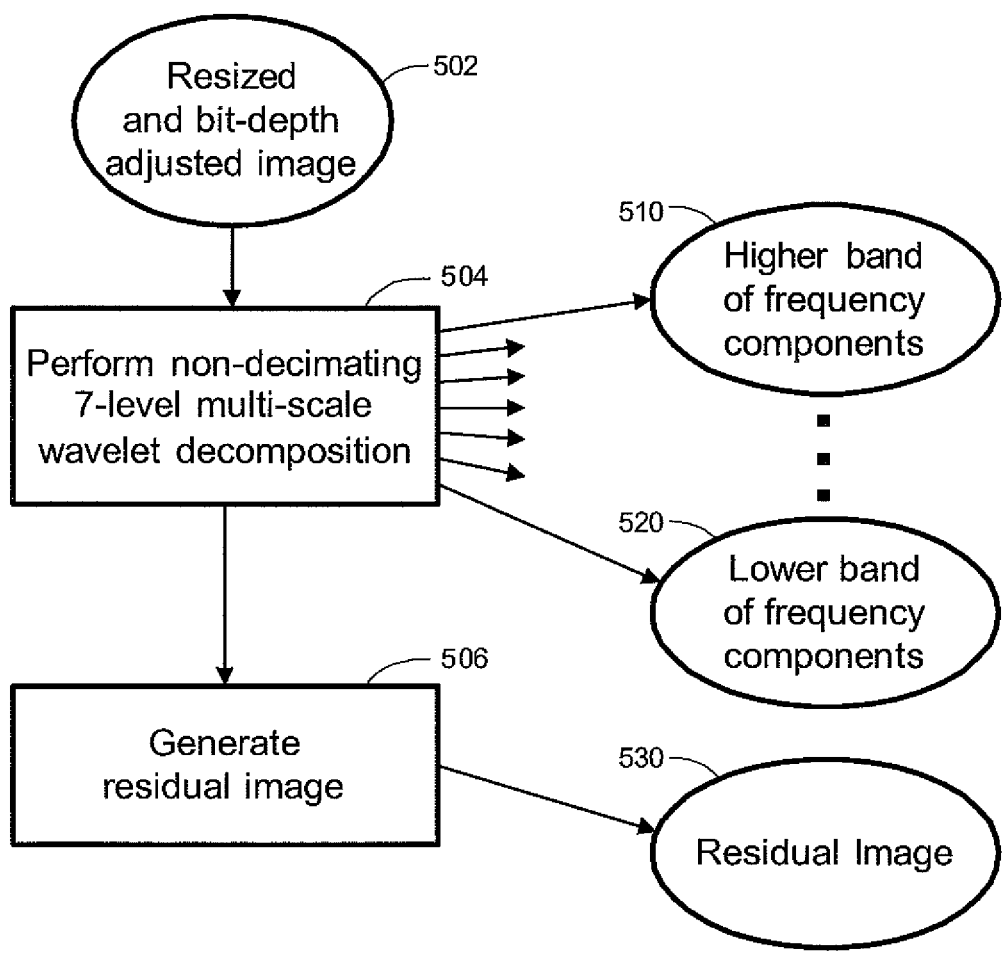
FIG. 5 is a flow diagram illustrating multi-scale decomposition of an image according to an embodiment of the invention.
Figure 6:
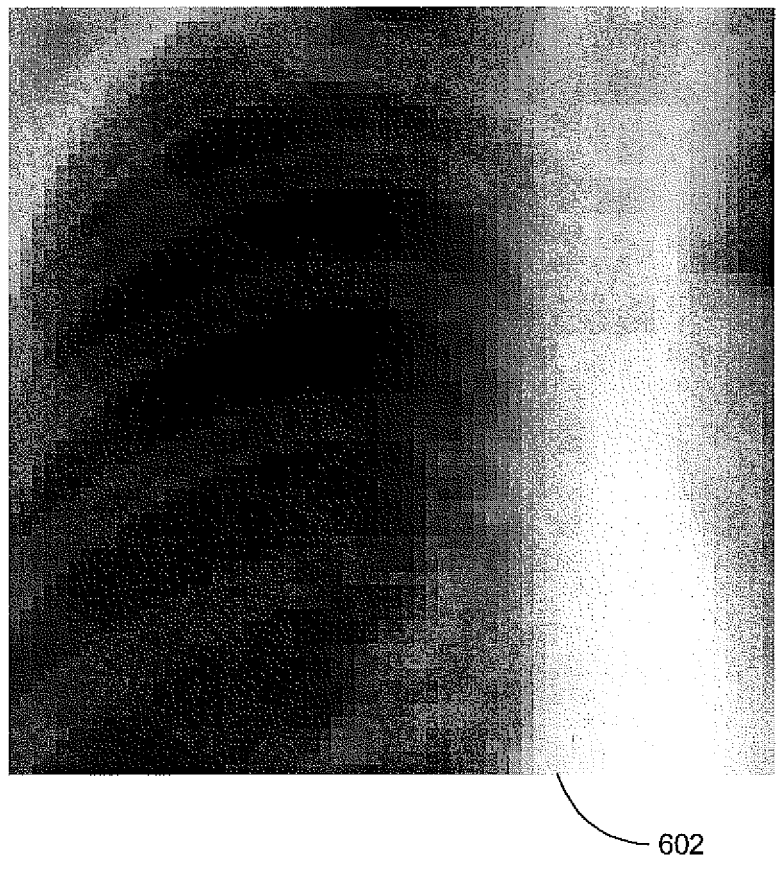
FIG. 6 shows for illustrative purposes a representative portion of a chest radiograph.
Figure 7A:
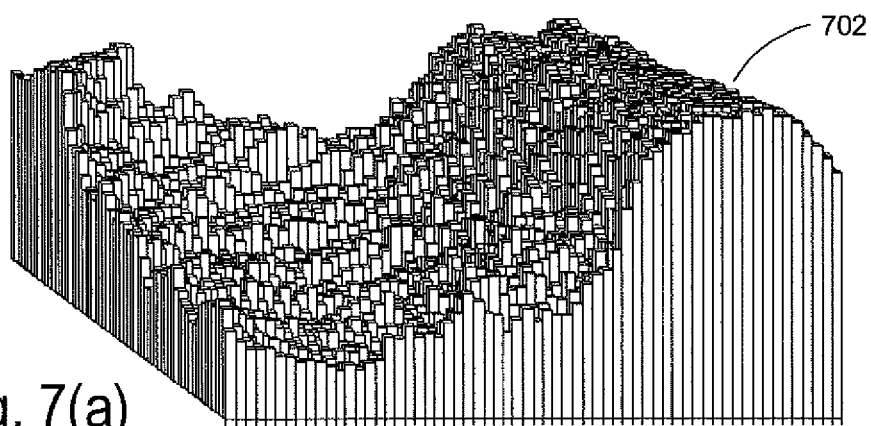
FIG. 7 further illustrates the multi-scale decomposition of an image, with FIG. 7(a) illustrating the highest spatial frequencies of the decomposed image.
FIG. 7(b) illustrating the next lower spatial frequency components.
FIG. 7(c) illustrating the third spatial frequency components.
FIG. 7(d) illustrating the lower spatial frequency components from the decomposition.
FIG. 7(e) illustrating the "residual" image after decomposition.
Figure 7B:
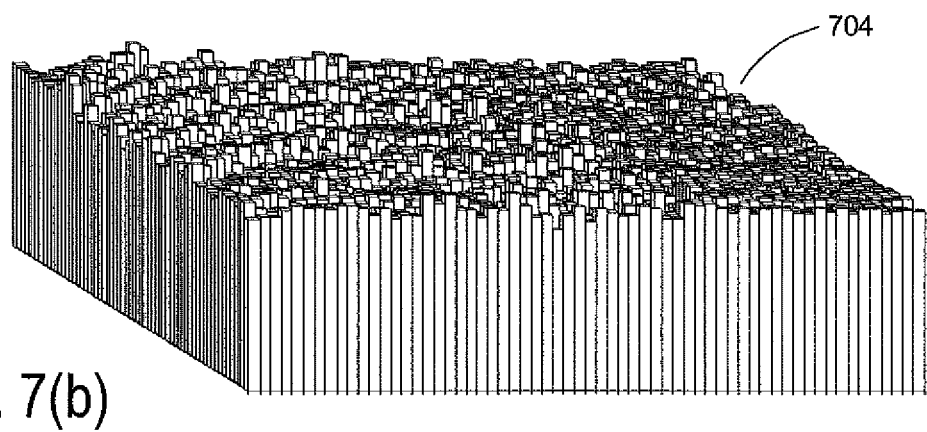
Figure 7C:
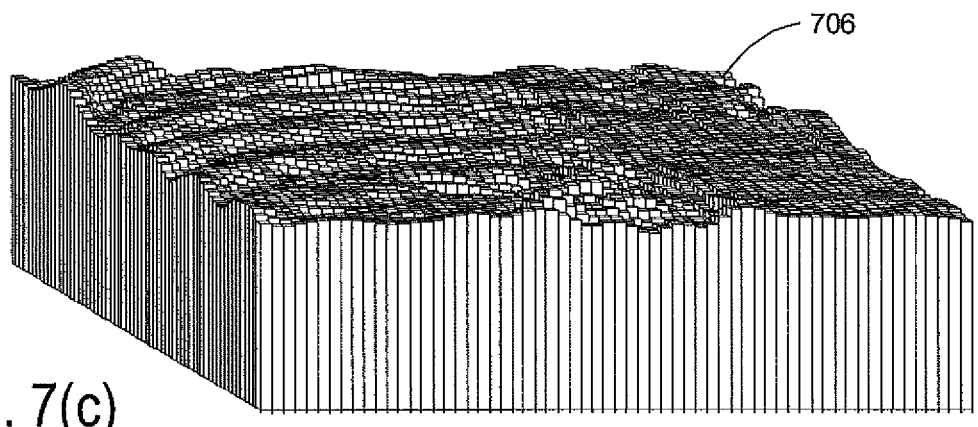
Figure 7D:
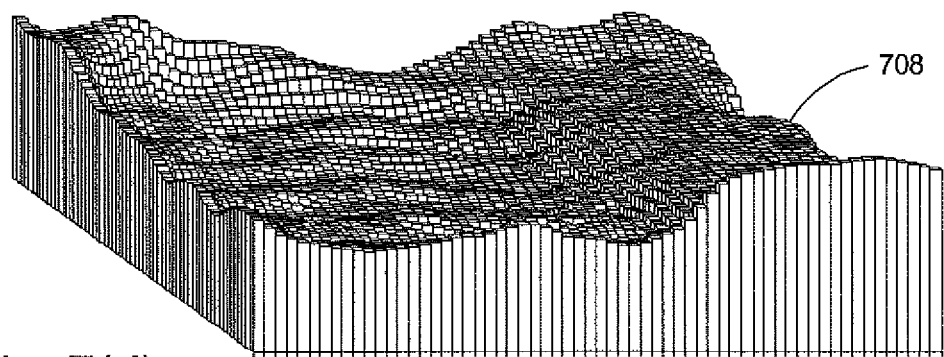
Figure 7E:
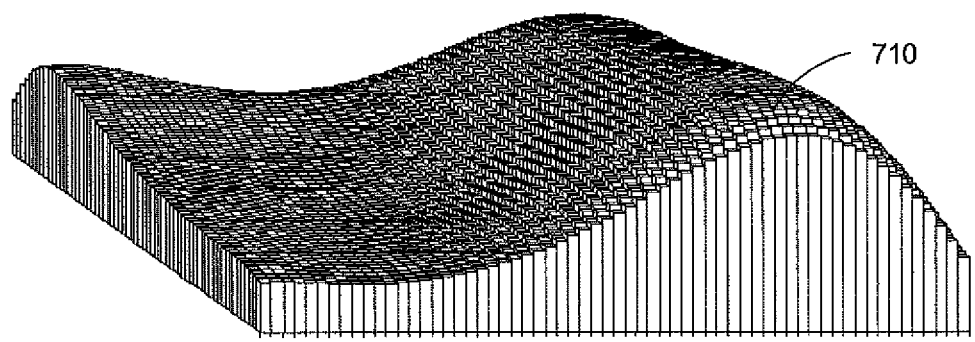

FIGS. 5, 6, and 7 further illustrate the multi-scale decomposition of a resized and bit-depth adjusted image according to an exemplary embodiment of the invention. FIG. 5 is a flow diagram illustrating an embodiment of image decomposition. A non-decimating 7-level multi-scale wavelet decomposition 504 may be performed on the resized and bit depth adjusted image 502 (it is noted that such the invention is not limited to this particular decomposition, however), which may result in sub-images containing an upper band of frequency components 510, intermediate bands (not shown), and a lower band of frequency components 520. A residual image 530, including those spatial frequencies below the lower band of the decomposition, may also be created 506.

FIG. 6 shows, for illustrative purposes only, a portion of a hypothetical chest radiogram, while FIG. 7(*a*) shows the hypothetical radiogram depicted as an array of pixel values (it should be noted that the resolution does not correspond to that of a true radiogram, and that the figures serve only as a tutorial device). The bright areas in FIG. 6 can be seen to correspond to high pixel values in FIG. 7, and the darker areas of FIG. 6 to lower pixel values.

FIG. 7(*b*) illustrates the highest frequency components from an image decomposition of the hypothetical radiogram. It may be observed that noise contributes largely to the pixel values. In a true radiographic image, it has been observed that there may often be little of interest in the highest level of the decomposition, which may mostly comprise noise.

FIG. 7(*c*) illustrates the next level of a decomposition of the hypothetical radiogram. It may be observed that more actual structure from the image is apparent. FIG. 7(*d*) shows the lowest level of a decomposition of the hypothetical radiogram (levels intermediate between 7(*c*) and 7(*d*) may also exist but have been omitted); it may be observed that larger structures, having lower spatial frequencies, may be visible. FIG. 7(*e*) shows the "residual" image from a decomposition of the hypothetical radiogram, which is what remains of the original image after the decomposition levels are removed.

The multi-scale decomposition, gray scale registration, and noise removal processes may be carried out jointly, according to various embodiments of the invention. Each multi-scale detail may be successively generated and processed for noise removal, and gray scale registration may be accomplished. In one exemplary embodiment of the invention, the only noise removal that occurs may be to leave the first multi-scale detail out of the reconstruction. For chest radiographs, this detail may often contain very little information and may be almost entirely noise.

In order to register the gray scale values, each multi-scale detail may be subjected to a model matching process. The model may be derived empirically or analytically and may be based on a-priori knowledge of a target distribution or derived "on-the-fly" to achieve a desired result such as maximum signal-to-noise for target scale(s). This may be used to map the multi-scale details to a target distribution, may suppress and enhance the overall content at each scale, and may be used to account for variations in contrast, sharpness, and/or brightness, which may thus allow the method to operate across a wide variety of acquisition settings. By successively adding these registered details, a normalized image may be formed. Such a capability may allow known sensor artifacts to be suppressed while retaining the target signal.

The residual image of the multi-scale transform may be kept separate from the normalized part. The normalized image may represent the structural content of the image, while the coarse image may represent the low-frequency content that is typically patient and/or dose specific and may carry very little information.

One may, thereby, obtain two images: one image, the normalized image, may correspond to the reconstructed multi-scale details that have been normalized; the other image may correspond to a low-pass residual that may only contain gross global differences in image (this image, while not necessarily being included in all subsequent processes, may be added back at the end to preserve the relative appearance of different areas; it is also noted that this component may be dynamically weighted to thereby provide different degrees of tissue equalization).

The degree of visual enhancement may be adapted based on an explicit segmentation of region(s) or adapted based on an implicit estimate of region's density. In chest X-rays it is well known that the latitude of the image may be quite large due to the wide range of absorption properties that may exist within the chest. For example, the heart and diaphragm may generally have a high absorption coefficient and may, therefore, require far greater enhancement than the air-filled region of the lung.

In the case of dynamic (implicit) adaptation to density, according to some embodiments of the invention, the following may be performed:

$$\text{Enhanced image} = G*C + K1*R, \qquad [\text{eq 1}]$$

where C may represent a registered/enhanced contrast component from the normalization; R may represent the coarse residual; and K1 is a scalar design parameter for dynamic range reduction; furthermore, G may be given by:

$$G = 1 + (K2)*\hat{R}^{K3} - (K4)*\hat{C}^{K5}, \qquad [\text{eq 2}]$$

where $\hat{R}$ is a quantized and scaled version of the image R; $\hat{C}$ is a quantized and scaled version of the image C; and parameters K2-K5 are scalar values used to control the relative contributions of contrast enhancement. K2-K5 are empirically determined through visual inspection.

The above formulation may permit the opaque regions of image (e.g., heart) to be enhanced sufficiently to allow nodules to visualized behind the heart while simultaneously not "over-enhancing" the air filled region. Over-enhancement of the air filled region may often lead to noise enhancement, an undesirable artifact.

The normalized image may be scaled to a target spatial sampling. The rescaled image may be further processed (which may be considered as part of the "enhancement" portion of the noise removal and enhancement) to account for localized dark areas introduced (or exaggerated) as part of the normalization process. Such further processing may include the addition of a Laplacian-of-Gaussians (LoG) image to the image. The LoG image may be clipped and/or scaled so as not to introduce discontinuities.

Figure 8:
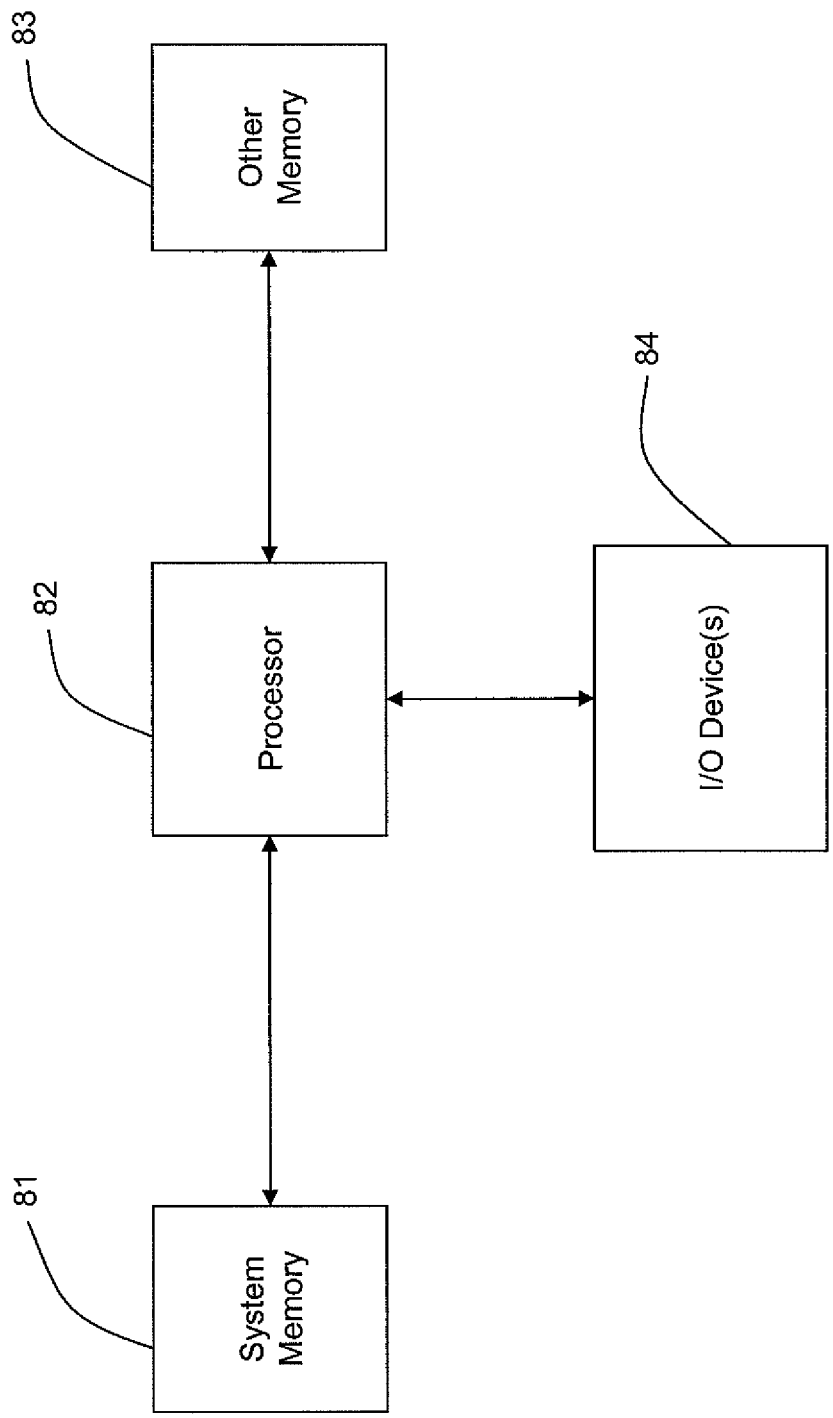
FIG. 8 illustrates a conceptual block diagram of a system in which all or a part of various embodiments of the invention may be implemented.

Various embodiments of the invention may comprise hardware, software, and/or firmware. FIG. 8 shows an exemplary system that may be used to implement various forms and/or portions of embodiments of the invention. Such a computing system may include one or more processors 82, which may be coupled to one or more system memories 81. Such system memory 81 may include, for example, RAM, ROM, or other such computer-readable media, and system memory 81 may be used to incorporate, for example, a basic I/O system (BIOS), operating system, instructions/software for execution by processor 82, etc. The system may also include further memory 83, such as additional RAM, ROM, hard disk drives, or other computer-readable storage media. Processor 82 may also be coupled to at least one input/output (I/O) interface 84. I/O interface 84 may include one or more user interfaces, as well as readers for various types of storage media and/or connections to one or more communication networks (e.g., communication interfaces and/or modems), from which, for example, software code may be obtained, e.g., by downloading such software from a computer over a communication network. Furthermore, other devices/media may also be coupled to and/or interact with the system shown in FIG. 8.

The above is a detailed description of particular embodiments of the invention. It is recognized that departures from the disclosed embodiments may be within the scope of this invention and that obvious modifications will occur to a person skilled in the art. It is the intent of the applicant that the invention include alternative implementations known in the art that perform the same functions as those disclosed. This specification should not be construed to unduly narrow the full scope of protection to which the invention is entitled.

What is claimed is:

1. A method of processing an image, comprising:
    normalizing the image, including resizing the image and adjusting the image bit depth, to obtain a pre-normalized image;
    obtaining from the pre-normalized image, by an automated processing device, multiple component images, using multi-scale decomposition;
    performing gray-scale registration based on the multiple component images, wherein the gray-scale registration includes performing histogram matching of the multiple component images in accordance with a target distribution corresponding to at least one histogram obtained based on at least one other image;
    removing unwanted information from the image using the multiple component images;
    normalizing the image based on the multiple component images; and
    enhancing the image by combining a result of the normalizing with a coarse residual component comprising low-frequency information, wherein the combining includes:
    multiplying the result of the normalizing by a first factor computed based on a quantized and scaled version of the coarse residual component and on a quantized and scaled version of the result of the normalizing; and
    multiplying the coarse residual component by a scalar design parameter for dynamic range reduction.

2. The method of claim 1, wherein the multi-scale decomposition comprises at least one decomposition technique selected from the group consisting of: steerable pyramids, Laplacian pyramids, wavelets, and curvelets.

3. The method of claim 1, wherein the multi-scale decomposition results in an upper-frequency sub-image, and wherein removing unwanted information comprises removing at least one component corresponding to the upper-frequency sub-image.

4. The method of claim 1, wherein performing a multi-scale decomposition results in a set of multi-scale components that includes the coarse residual component.

5. The method of claim 4, further comprising performing, on the set of multi-scale components, except for the coarse residual component, at least one of said gray scale registration or said removing unwanted information.

6. The method of claim 1, further comprising downloading software instructions that, if executed by a processor, cause the processor to perform said normalizing to obtain a pre-normalized image, said obtaining, said performing, said removing, said normalizing based on the multiple component images, and said enhancing.

7. A non-transitory computer-readable medium containing software instructions that, if executed by a processor, cause the processor to perform operations comprising:
    normalizing the image, including resizing the image and adjusting the image bit depth, to obtain a pre-normalized image;
    obtaining from the pre-normalized image, by an automated processing device, multiple component images, using multi-scale decomposition;
    performing gray-scale registration based on the multiple component images, wherein the gray-scale registration includes performing histogram matching of the multiple component images in accordance with a target distribution corresponding to at least one histogram obtained based on at least one other image;
    removing unwanted information from the image using the multiple component images;
    normalizing the image based on the multiple component images; and
    enhancing the image by combining a result of the normalizing with a coarse residual component comprising low-frequency information, wherein the combining includes:
    multiplying the result of the normalizing by a factor computed based at least in part on a quantized and scaled version of the coarse residual component and on a quantized and scaled version of the result of the normalizing; and
    multiplying the coarse residual component by a scalar design parameter for dynamic range reduction.

8. The medium of claim 7, wherein the multi-scale decomposition comprises at least one decomposition technique selected from the group consisting of: steerable pyramids, Laplacian pyramids, wavelets, and curvelets.

9. The medium of claim 7, wherein the multi-scale decomposition results in an upper-frequency sub-image, and wherein removing unwanted information comprises removing at least one component corresponding to the upper-frequency sub-image.

10. The medium of claim 7, wherein performing a multi-scale decomposition results in a set of multi-scale components that includes the coarse residual component.

11. The medium of claim 10, further comprising performing, on the set of multi-scale components, except for the coarse residual component, at least one of said gray scale registration or said removing unwanted information.

12. The medium of claim 7, wherein said factor is further computed based on a set of scalar parameters configured to control relative contributions of contrast enhancement.

13. The method of claim 1, wherein said factor is further computed based on a set of scalar parameters configured to control relative contributions of contrast enhancement.

* * * * *